Patented July 8, 1941

2,248,729

UNITED STATES PATENT OFFICE 2,248,729

QUATERNARY ALLSYLOL POLY-AMMONIUM COMPOUNDS AND PROCESS FOR PRODUCING THEM

Heinrich Ulrich and Ernst Ploetz, Ludwigshafen-on-the-Rhine, Germany, assignors, by mesne assignments, to General Aniline & Film Corporation, New York, N. Y., a corporation of Delaware No Drawing. Application March 18, 1939, Serial No. 262,782. In Germany September 26, 1934

10 Claims. (Cl. 260—584)

This application is a continuation-in-part application of application Serial No. 165,488, filed on September 24, 1937, now Patent 2,173,069.

The present invention relates to a new process of producing quaternary ammonium compounds.

We have now found that quaternary ammonium compounds can be prepared by causing alkylene oxides to react in an aqueous medium with amines containing in the molecule at least one hydroxyalkyl group and at least two amino nitrogen atoms and wherein all amino groups are tertiary amino groups while reducing the alkaline reaction of the reaction mixture nearly to the neutral point, at least at the commencement of the reaction. The process is preferably carried out at a hydrogen ion concentration of between pH=about 8 and about 9.6, the pH-value being less than 9, advantageously less than 8.5 at the commencement. In this manner compounds containing one or more quaternary ammonium groups and at least two hydroxyalkyl groups are obtained in good yields.

As initial materials may be mentioned on the one hand tertiary amines in which to the amino nitrogen atoms one or more hydroxyalkyl groups may be attached. While one hydroxyalkylol group must necessarily be present in the molecule of the initial material, the remaining valencies of the amino nitrogen atoms may be saturated by other organic radicles, such as alkyl, cycloalkyl or aralkyl groups. On the other hand alkylene oxides, such as ethylene oxide or propylene oxide serve as initial components. The reaction is preferably carried out between 50° and 100° C. but somewhat lower or higher temperatures may also be employed.

The adjustment of the desired hydrogen ion concentration may be effected by complete or partial neutralization of the amine with organic acids, such as lactic acid, formic acid, acetic acid, butyric acid, or high molecular fatty acids for example those containing more than 6 carbon atoms in the molecule, such as stearic acid, or by partial neutralization with a strong inorganic acid, such as hydrochloric acid, sulphuric acid, phosphoric acid or nitric acid; acid salts of polybasic acids may also be used for adjusting the hydrogen ion concentration. The addition of these acid substances may take place before or during the reaction.

The quaternary ammonium compounds obtained, in contrast to the corresponding substances of the type of hydroxyalkyl ethers, cannot be distilled in vacuo without decomposition. For the purpose of distinguishing and separating the quaternary ammonium compounds from the corresponding hydroxyalkyl ether-like substances (which may be formed in subordinate amounts as by-products) differences in solubility may be employed.

Tertiary amines which may be employed with advantage as initial materials are for example N.N.N'.N'-tetraethanol ethylene diamine, N.N'-dimethyl-N.N'-diethanol ethylene diamine, N.N-diethyl-N'.N'-diethanolamine, N-methyl-N.N'.N'-triethanolamine, penta-ethanol-diethylene triamine, completely hydroxy-alkylated or alkylated-hydroxyalkylated derivatives of higher polyalkylene polyamines (such as triethylene tetramine), compounds corresponding to the formulae (HO.C₂H₄)₂=N—CH₂—CH(OH)—
                        CH₂—N=(C₂H₄.OH)₂
(HO.C₂H₄)₂=N—C₂H₄—O—
                        C₂H₄—N=(C₂H₄.OH)₂

(obtainable by acting with ethylene oxide on the corresponding non-hydroxyalkylated compounds) and similar amines.

The products according to the present invention are suitable as assistants for the textile and related industries, as for example as additions in cloth printing, and also as additions in the preparation of artificial threads for example in spinning baths and furthermore for the preparation of dyestuff pastes and powders.

The following examples will further illustrate the nature of this invention but the invention is not restricted to these examples. The parts are by weight.

Example 1

236 parts of N.N.N'.N'-tetrahydroxyethyl ethylene diamine are dissolved in 1000 parts of water and 100 parts of 36.5 per cent hydrochloric acid are added, the pH-value of the resulting solution being between 8 and 8.4. 100 parts of ethylene oxide are led into the solution at between 50° and 70° C. The reaction mixture is then evaporated in vacuo. More than 70 per cent of the amine employed are converted into N.N.N.N'.N'.N'-hexahydroxyethyl ethylene diammonium compounds.

If instead of N.N.N'.N'-tetrahydroxyethyl ethylene diamine there are employed N.N-diethyl-N'.N'-dihydroxyethyl ethylene diamine or N.N'-dimethyl-N.N'-dihydroxyethyl ethylene diamine or N.N.N'-triethyl-N'-hydroxyethyl ethylene diamine, ammonium compounds are formed in an analogous manner.

Example 2

162 parts of pentahydroxyethyl diethylene triamine corresponding to the formula

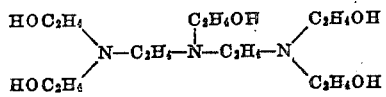

are dissolved in 500 parts of water and 100 parts of 25 per cent sulphuric acid are added. 25 parts of ethylene oxide are led into the solution formed (the pH-value of which is between 8.2 and 8.6) at 60° to 70° C. During this treatment the pH-value rises to 9; it is adjusted to from 8 to 8.6 by the addition of 100 parts of 25 per cent sulphuric acid; another 25 parts of ethylene oxide are introduced. The addition of 100 parts of 25 per cent sulphuric acid and of 25 parts ethylene oxide are repeated once more. Thus more than 80 per cent of the tertiary amine originally employed are converted into a quaternary ammonium compound.

Example 3

206 parts of N.N'-dimethyl-N.N'-dihydroxyethyl-1.3-diaminopropanol-(2) are mixed with 1000 parts of 10 per cent sulphuric acid. The pH-value of the solution obtained is between 8.0 and 8.4. 50 parts of ethylene oxide are led in at 70° C. After the addition of 500 parts of 10 per cent sulphuric acid another 50 parts of ethylene oxide are led in. A solution of N.N'-dimethyl - N.N'.N' - tetrahydroxyethyl - 2 - hydroxypropane-1.3-diammonium sulphate is obtained; more than 70 per cent of the initial material is converted into the quaternary ammonium compound.

If N.N.N'.N'-tetrahydroxyethyl diamino diethylether corresponding to the formula

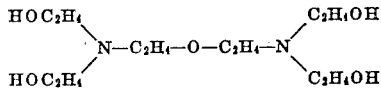

is employed as initial material the course of reaction is analogous.

What we claim is:

1. The quaternary ammonium compound corresponding to the formula

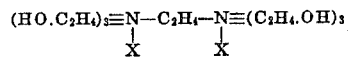

wherein X stands for an anion.

2. The quaternary ammonium compound corresponding to the formula

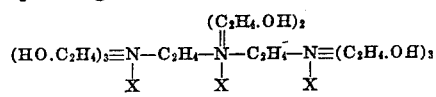

wherein X stands for an anion.

3. The process of producing quaternary ammonium compounds which comprises causing an alkylene oxide to react with an amine corresponding to the general formula

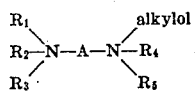

(wherein $R_1$, $R_2$, $R_3$, $R_4$ and $R_5$ stand for radicals selected from the class consisting of lower alkyl and hydroxy lower alkyl radicals and A stands for a member of the group consisting of divalent aliphatic saturated hydrocarbon radicals, divalent aliphatic saturated hydrocarbon radicles interrupted by oxygen atoms and divalent aliphatic saturated hydrocarbon radicles interrupted by tertiary amino groups) in an aqueous medium the pH-value of which is between about 8 and about 9 at the beginning of the reaction.

4. The process of producing quaternary ammonium compounds which comprises causing a alkylene oxide to react with an amine corresponding to the general formula

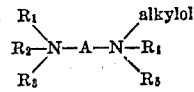

(wherein $R_1$, $R_2$, $R_3$, $R_4$ and $R_5$ stand for radicals selected from the class consisting of lower alkyl and hydroxy lower alkyl radicals and A stands for a member of the group consisting of divalent aliphatic saturated hydrocarbon radicals, divalent aliphatic saturated hydrocarbon radicles interrupted by oxygen atoms and divalent aliphatic saturated hydrocarbon radicles interrupted by tertiary amino groups) in an aqueous medium the pH-value of which is between about 8 and about 9 at the beginning of the reaction, a pH-value between about 8 and about 9.6 being maintained during the reaction.

5. The process of producing quaternary ammonium compounds which comprises causing an alkylene oxide to react with an amine corresponding to the general formula

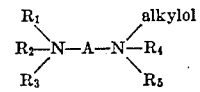

(wherein $R_1$, $R_2$, $R_3$, $R_4$ and $R_5$ stand for radicals selected from the class consisting of lower alkyl and hydroxy lower alkyl radicals and A stands for a member of the group consisting of divalent aliphatic saturated hydrocarbon radicals, divalent aliphatic saturated hydrocarbon radicles interrupted by oxygen atoms and divalent aliphatic saturated hydrocarbon radicles interrupted by tertiary amino groups) in an aqueous medium the pH-value of which is less than 9 at the beginning of the reaction, the pH-value being between about 8 and about 9.6 during the further course of the reaction.

6. The process of producing quaternary ammonium compounds which comprises causing an alkylene oxide to react with an amine corresponding to the general formula

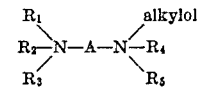

(wherein $R_1$, $R_2$, $R_3$, $R_4$ and $R_5$ stand for radicals selected from the class consisting of lower alkyl and hydroxy lower alkyl radicals and A stands for a member of the group consisting of divalent aliphatic saturated hydrocarbon radicals, divalent aliphatic saturated hydrocarbon radicles interrupted by oxygen atoms and divalent aliphatic saturated hydrocarbon radicles interrupted by tertiary amino groups) at between 50° and 100° C., in an aqueous medium the pH-value of which is less than 9 at the beginning of the reaction, the pH-value being between about 8 and about 9.6 during the further course of the reaction.

7. The process of producing quaternary ammonium compounds which comprises causing an alkylene oxide to react with an amine corresponding to the general formula

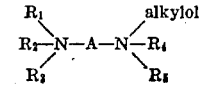

(wherein $R_1$, $R_2$, $R_3$, $R_4$ and $R_5$ stand for radicles selected from the class consisting of lower alkyl and hydroxy lower alkyl radicles and A stands for a member of the group consisting of divalent aliphatic saturated hydrocarbon radicles, divalent aliphatic saturated hydrocarbon radicles interrupted by oxygen atoms and divalent aliphatic saturated hydrocarbon radicles interrupted by tertiary amino groups) in an aqueous medium the pH-value of which is adjusted by the addition of an acid to between about 8 and about 9 at the beginning of the reaction.

8. The process of producing quaternary ammonium compounds which comprises causing an alkylene oxide to react with an amine corresponding to the general formula

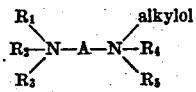

(wherein $R_1$, $R_2$, $R_3$, $R_4$ and $R_5$ stand for radicles selected from the class consisting of lower alkyl and hydroxy lower alkyl radicles and A stands for a member of the group consisting of divalent aliphatic saturated hydrocarbon radicles, divalent aliphatic saturated hydrocarbon radicles interrupted by oxygen atoms and divalent aliphatic saturated hydrocarbon radicles interrupted by tertiary amino groups) in an aqueous medium the pH-value of which is adjusted by the addition of a strong mineral acid to between about 8 and about 9 at the beginning of the reaction.

9. The process of producing quaternary ammonium compounds which comprises causing an alkylene oxide to react with an amine corresponding to the general formula

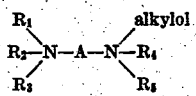

(wherein $R_1$, $R_2$, $R_3$, $R_4$ and $R_5$ stand for radicles selected from the class consisting of lower alkyl and hydroxy lower alkyl radicles and A stands for a member of the group consisting of divalent aliphatic saturated hydrocarbon radicles, divalent aliphatic saturated hydrocarbon radicles interrupted by oxygen atoms and divalent aliphatic saturated hydrocarbon radicles interrupted by tertiary amino groups) in an aqueous medium the pH-value of which is adjusted by the addition of a high molecular fatty acid to between about 8 and about 9 at the beginning of the reaction.

10. Quaternary ammonium compounds corresponding to the general formula

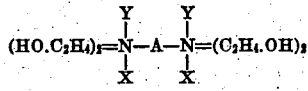

wherein X stands for an anion, Y for a radicle selected from the class consisting of lower alkyl and hydroxy lower alkyl radicles and A stands for a radicle selected from the class consisting of divalent saturated aliphatic hydrocarbon radicles, divalent aliphatic saturated hydrocarbon radicles interrupted by oxygen atoms and divalent aliphatic saturated hydrocarbon radicles interrupted by tertiary amino groups.

HEINRICH ULRICH.
ERNST PLOETZ.